United States Patent
Eidam et al.

(10) Patent No.: US 10,510,054 B1
(45) Date of Patent: Dec. 17, 2019

(54) AUGMENTED REALITY ENHANCEMENTS FOR FINANCIAL ACTIVITIES

(71) Applicant: Wells Fargo Bank, N.A., San Francisco, CA (US)

(72) Inventors: Kourtney Eidam, Marietta, GA (US); Christin Chan, Pleasanton, CA (US); Nicholas Edwardsen, Des Moines, IA (US); Chad A. Hanson, Clive, IA (US); Miranda C. Hill, Seattle, WA (US); Brian Michael Pearce, Pleasanton, CA (US); Dominik Vltavsky, Belmont, CA (US); Katherine A. Zagone, Portland, OR (US)

(73) Assignee: Wells Fargo Bank, N.A., San Francisco, CA (US)

( * ) Notice: Subject to any disclaimer, the term of this patent is extended or adjusted under 35 U.S.C. 154(b) by 828 days.

(21) Appl. No.: 14/143,658

(22) Filed: Dec. 30, 2013

(51) Int. Cl.
*G06Q 20/10* (2012.01)

(52) U.S. Cl.
CPC .................. *G06Q 20/102* (2013.01)

(58) Field of Classification Search
CPC ....................................................... G06Q 20/10
USPC ......................................................... 705/40
See application file for complete search history.

(56) References Cited

U.S. PATENT DOCUMENTS

| | | |
|---|---|---|
| 5,920,848 A | 7/1999 | Schutzer et al. |
| 5,947,526 A | 9/1999 | Neu |
| 7,254,548 B1 | 8/2007 | Tannenbaum |
| 7,337,947 B1 | 3/2008 | Swanson, Sr. |
| 7,481,359 B2 | 1/2009 | Kawase et al. |
| 7,634,662 B2 | 12/2009 | Monroe |
| 7,653,600 B2 | 1/2010 | Gustin et al. |
| 7,672,870 B2 | 3/2010 | Haines et al. |
| 7,980,462 B1 | 7/2011 | Graef et al. |
| 8,019,648 B2 | 9/2011 | King et al. |
| 8,070,055 B2 | 12/2011 | Block et al. |
| 8,090,159 B2 | 1/2012 | Gabara |
| 8,244,002 B2 | 8/2012 | Chen et al. |
| 8,370,639 B2 | 2/2013 | Azar et al. |
| 8,438,110 B2 | 5/2013 | Calman et al. |

(Continued)

FOREIGN PATENT DOCUMENTS

| | | |
|---|---|---|
| CA | 2 876 298 | 7/2015 |
| JP | 2006-99445 A | 4/2006 |

(Continued)

OTHER PUBLICATIONS

Augmented Reality, Tommytoy.typepad.com, https://web.archive.org/web/20130901224748/http://tommytoy.typepad.com/tommy-toy-pbt-consultin/augmented-reality/, 69 pages (Aug. 6, 2013).

(Continued)

*Primary Examiner* — Alexander G Kalinowski
*Assistant Examiner* — Ambreen A. Alladin
(74) *Attorney, Agent, or Firm* — Merchant & Gould P.C.

(57) ABSTRACT

A system implemented on an augmented reality electronic device includes scanning an item using the augmented reality device. Financial information is obtained from the scanned item. The financial information and an indication of user authentication are sent to a server computer. A confirmation is displayed on the augmented reality device that a financial transaction using the financial information has been completed.

4 Claims, 13 Drawing Sheets

(56) References Cited

U.S. PATENT DOCUMENTS

| | | |
|---|---|---|
| 8,554,647 B1 | 10/2013 | Grigg et al. |
| 8,594,931 B2 | 11/2013 | Sterkel et al. |
| 8,639,622 B1 | 1/2014 | Moore et al. |
| 8,751,393 B1 | 6/2014 | Murray et al. |
| 8,935,799 B1 | 1/2015 | Anderson et al. |
| 2003/0105711 A1 | 6/2003 | O'Neil |
| 2006/0031123 A1 | 2/2006 | Leggett et al. |
| 2006/0218006 A1 | 9/2006 | Malik et al. |
| 2007/0108275 A1 | 5/2007 | Shuster |
| 2007/0233839 A1 | 10/2007 | Gaos |
| 2009/0138386 A1 | 5/2009 | Wilson, Jr. et al. |
| 2010/0030578 A1 | 2/2010 | Siddique et al. |
| 2010/0057574 A1 | 3/2010 | Banerjee et al. |
| 2010/0153242 A1 | 6/2010 | Preston et al. |
| 2010/0324727 A1 | 12/2010 | Eonnet |
| 2011/0055049 A1 | 3/2011 | Harper et al. |
| 2011/0099067 A1 | 4/2011 | Cooper et al. |
| 2011/0150296 A1 | 6/2011 | Eckhoff et al. |
| 2011/0153310 A1 | 6/2011 | Ehlen et al. |
| 2011/0264470 A1 | 10/2011 | Miller |
| 2011/0266340 A9 | 11/2011 | Block et al. |
| 2012/0094639 A1 | 4/2012 | Carlson et al. |
| 2012/0095853 A1 | 4/2012 | von Bose et al. |
| 2012/0105476 A1 | 5/2012 | Tseng |
| 2012/0136779 A1 | 5/2012 | Nonaka |
| 2012/0185381 A1 | 7/2012 | Kim |
| 2012/0192235 A1 | 7/2012 | Tapley et al. |
| 2012/0197773 A1 | 8/2012 | Grigg et al. |
| 2012/0212414 A1 | 8/2012 | Osterhout et al. |
| 2012/0216149 A1 | 8/2012 | Kang et al. |
| 2012/0218188 A1 | 8/2012 | Kashitani |
| 2012/0230577 A1* | 9/2012 | Calman ............... G06Q 20/042 382/138 |
| 2012/0231424 A1 | 9/2012 | Calman et al. |
| 2012/0231814 A1 | 9/2012 | Calman et al. |
| 2012/0232937 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0233015 A1 | 9/2012 | Calman et al. |
| 2012/0233032 A1 | 9/2012 | Calman et al. |
| 2012/0233072 A1 | 9/2012 | Calman et al. |
| 2012/0239564 A1 | 9/2012 | Summerrow et al. |
| 2012/0242696 A1 | 9/2012 | Martin |
| 2012/0303528 A1 | 11/2012 | Weiner et al. |
| 2012/0320216 A1 | 12/2012 | Mkrtchyan et al. |
| 2013/0016123 A1 | 1/2013 | Skarulis |
| 2013/0030994 A1 | 1/2013 | Calman et al. |
| 2013/0033522 A1 | 2/2013 | Calman et al. |
| 2013/0046633 A1 | 2/2013 | Grigg et al. |
| 2013/0060691 A1 | 3/2013 | Typrin et al. |
| 2013/0093759 A1 | 4/2013 | Bailey |
| 2013/0208234 A1 | 8/2013 | Lewis |
| 2013/0215116 A1 | 8/2013 | Siddique et al. |
| 2013/0222369 A1 | 8/2013 | Huston et al. |
| 2013/0228615 A1 | 9/2013 | Gates et al. |
| 2013/0229261 A1 | 9/2013 | Gates et al. |
| 2013/0232048 A1 | 9/2013 | Corner |
| 2013/0282542 A1 | 10/2013 | White |
| 2014/0012691 A1 | 1/2014 | Hanson et al. |
| 2014/0075528 A1 | 3/2014 | Matsuoka |
| 2014/0147004 A1 | 5/2014 | Uchida |
| 2014/0181741 A1 | 6/2014 | Apacible et al. |
| 2014/0236789 A1 | 8/2014 | Caldwell |
| 2014/0244266 A1 | 8/2014 | Brown et al. |
| 2014/0298235 A1 | 10/2014 | Caldwell |
| 2014/0341441 A1 | 11/2014 | Slaby et al. |
| 2014/0372427 A1 | 12/2014 | Lehmann et al. |
| 2015/0012426 A1* | 1/2015 | Purves ............... G06Q 30/0623 705/41 |
| 2015/0127541 A1* | 5/2015 | Just ............... G06Q 20/10 705/44 |
| 2016/0070581 A1 | 3/2016 | Soon-Shiong |

FOREIGN PATENT DOCUMENTS

| | | | |
|---|---|---|---|
| KR | 10-2004-0026913 A | 4/2004 | |
| KR | 10-2008-0042374 A | 5/2008 | |
| KR | 10-2011-0078913 A | 7/2011 | |
| KR | 10-2011-0136457 A | 12/2011 | |

OTHER PUBLICATIONS

Bass, T., "Dress Code," http://archive.wired.com/wired/archive/6.04/wearables_pr.html, 10 pages (Copyright 1993-2004).

Bray, A., "Google Glass will Change Your Branches," http://www.americanbanker.com/bankthink/google-glass-will-change-your-branches-1057312-1.html, 6 pages (Mar. 7, 2013).

Elash, A. et al., "Canadian casinos, banks, police use facial-recognition technology," The Globe and Mail, http://www.theglobeandmail.com/news/national/time-to-lead/canadian-casinos-banks-police-use-facial-recognition-technology/article590998/, 4 pages (Sep. 6, 2012).

Harper, S. et al., "Sentinel: Universal Access to Ambient Devices," http://citeseerx.ist.psu.edu/viewdoc/download?doi=10.1.1.59.6168&rep=rep1&type=pdf, 5 pages (2003).

Leiva-Gomez, M., Cameras Scanning Credit Cards? Is That Even Secure?, http://www.mobilecommerceinsider.com/topics/mobilecommerceinsider/articles/344823-cameras-scanning-credit-cards-that-even-secure.htm, 3 pages (Jul. 8, 2013).

Lotte Credit Card Releases Asia's First Financial Mobile App with Augmented Reality for iPhone and Android Devices, PRWeb, http://www.prweb.com/releases/worklight/mobile-platform/prweb5210334.htm, 3 pages (Mar. 30, 2011).

Mok, S. et al., "Addressing Biometrics Security and Privacy Related Challenges in China," Proceedings of the International Conference o the Biometrics Special Interest Gropu (BIOSIG), 8 pages (Sep. 6-7, 2012).

Prindle, D., "Best Augmented Reality Apps," https://web.archive.org/web/20130407024439/http://www.digitaltrends.com/mobile/best-augmented-reality-apps/, 23 pages (Jan. 29, 2013).

Salo, M. et al., "Consumer value of camera-based mobile interaction with the real world," Pervasive and Mobile Computing, vol. 9, pp. 258-268 (2013).

Sterling, G., "Mobile Credit-Card Scanning Should be Ubiquitous," http://internet2go.net/news/local-search/credit-card-scanning-should-be-ubiquitous-mobile, 2 pages (Jul. 29, 2013).

Tatton, E., "Google Glass—Draft Document," https://prezi.com/kfvacljxv7fg/google-glass-draft-document/, 7 pages (May 6, 2013).

U.S. Appl. No. 14/143,633, filed Dec. 30, 2013 entitled "Augmented Reality Enhancements for Financial Activities".

U.S. Appl. No. 14/151,960, filed Jan. 10, 2014 entitled "Augmented Reality Virtual Banker".

U.S. Appl. No. 14/151,965, filed Jan. 10, 2014 entitled "Augmented Reality for Finiancial Budgeting and Spending".

Yamashita, A. et al., "Assisting system of visually impaired in touch panel operation using stereo camera," 18th IEEE International Conference on Image Processing (ICIP), http://sensor.eng.shizuoka.ac.jp/~yamasita/paper/B/B067Final.pdf, 4 pages (Sep. 11-14, 2011).

Yayla, A. et al., "An Exploration of Using Face Recognition Technologies for National Security," Turkish Journal of Police Studies, vol. 6, No. 1-2, pp. 141-157 (2004).

Blackwell, M., "An Image Overlay System for Medical Data Visualization," Medical Image Analysis, vol. 4, No. 1, pp. 67-72 (Mar. 2000).

Hollerer, T., "User Interfaces for Mobile Augmented Reality Systems," Columbia University, 238 pages (2004).

Liao, H., "3-D Augmented Reality for MRI-Guided Surgery Using Integral Videography Autostereoscopic Image Overlay," IEEE Transactions on BioMedical Engineering, vol. 57, No. 6, pp. 1476-1486 (Jun. 2010).

* cited by examiner

US 10,510,054 B1

AUGMENTED REALITY ENHANCEMENTS FOR FINANCIAL ACTIVITIES

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality electronic device, the method comprising: using the augmented reality electronic device, scanning an item; obtaining financial information from the scanned item; authenticating a user of the augmented reality device; sending the financial information and an indication of user authentication to a server computer; and displaying a confirmation on the augmented reality device that a financial transaction using the financial information has been completed.

In another aspect, a method implemented on an augmented reality electronic device comprises: using the augmented reality electronic device, scanning a check, a bill or a receipt; obtaining financial information from the check, bill or receipt; authenticating a user of the augmented reality device; sending the financial information and an indication of user authentication to a server computer; when the financial information is from the check, displaying a confirmation on the augmented reality device that the check has been deposited at a financial institution; when the financial information is from the bill, displaying a confirmation on the augmented reality device that the bill has been paid; and when the financial information is from the receipt, displaying a confirmation on the augmented reality device that the receipt has been added to an expense report.

In yet another aspect, augmented reality electronic computing device comprises: a processing unit; and system memory, the system memory including instructions which, when executed by the processing unit, cause the augmented reality electronic computing device to: scan an item; obtain financial information from the scanned item; authenticate a user of the augmented reality device; authenticate a user of the augmented reality device; display a confirmation on the augmented reality device that a financial transaction using the financial information has been completed.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for using augmented reality (AR) to enhance certain financial activities. In this disclosure, the financial activities involve the use of payment cards, checks, bills and receipts. However, the systems and methods may also apply to other financial activities.

As described in this disclosure, by viewing a payment card with an AR headset, a user's payment card balance or other financial information may be displayed on the AR headset. Other AR enhancements regarding payment cards may include displaying a color on the AR headset corresponding to a preset payment card or budget limit, viewing the payment card on the AR headset in a color that corresponds to the payment card or budget limit, having the payment card display a color corresponding to the preset payment card or budget limit and having the payment card flash when the payment card is missing or stolen. Other AR enhancements involving payment cards are possible.

Also, as described in this disclosure, AR enhancements include depositing checks using an AR headset, paying a bill using an AR headset and reading and registering receipts using an AR headset. Other financial activities involving AR are possible.

The systems and methods are described for an AR headset that may be worn by a user. The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability. The biometric capability permits biometric authentication of the user, as described in more detail later herein.

One type of AR headset described in this disclosure is a smart glass type of headset, similar to eyeglasses, that may be worn by the user. The user may view AR images in the glass portion of the headset. An example of a smart glass headset is Google Glass, from Google Inc. of Mountain View, Calif.

Although the systems and methods described in this disclosure make use of an AR headset, the systems and methods are not limited to an AR headset. In some implementations, other technologies such as smart telephones and tablet computers, etc. may be used.

Figure 1:
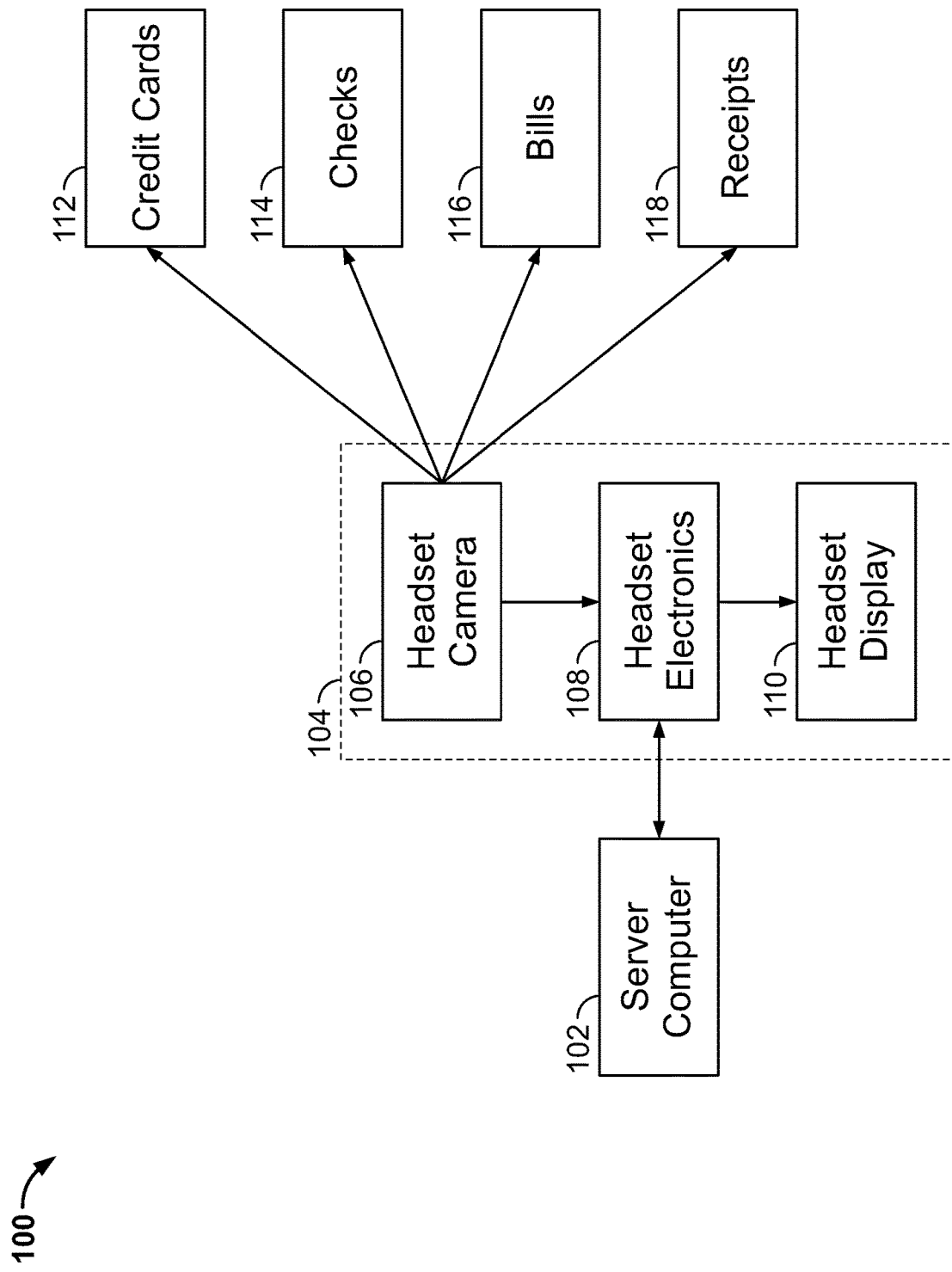
FIG. 1 shows an example system in which an augmented reality (AR) headset may be used to provide enhancements for financial activities.

FIG. 1 shows an example system 100 for which AR may be used to provide enhancements for financial activities. The example system 100 includes a server computer 102, an AR headset 104, payment cards 112, checks 114, bills 116 and receipts 118.

The example server computer 102 is typically a server computer at a bank or other financial institution. A wireless connection may be established between the AR headset 104 and the server computer 102. Financial information relating to the user's payment card may be transmitted from server computer 102 to AR headset 104.

The example AR headset 104 includes a headset camera 106, headset electronics 108 and a headset display 110. The example headset camera 106 is a camera that is typically mounted to the headset such that a lens of the camera has a same orientation as the user. When the user looks at an object or a scene, the camera is positioned to record or transmit what the user sees. The headset electronics 108 includes an electronic computing device with wireless capability. The wireless capability may include Bluetooth, radio frequency identification (RFID) or similar types of wireless capability. The headset electronics 108 may also include optical character recognition (OCR).

The headset camera 106 may scan or record a picture of any of the payment cards 112, checks 114, bills 116 or receipts 118. For example, the headset camera 106 may scan the front and back of a payment card 112. The headset electronics 108 may then use optical character recognition to obtain a payment card identification number and customer security code (CSC) from the scanned payment card images. The headset electronics 108 may establish a wireless connection to server computer 102, authenticate the user, as described in more detail later herein, and obtain payment card financial data for the user. The payment card financial data may be displayed on the headset display 110, for example on the glass portion of a Google Glass headset.

In some implementations, only the front of the payment card is scanned and only the payment card identification number is sent to server computer 102. For example, if an authentication of the user is confirmed, using an authentication method described later herein, the CSC code may not be necessary.

Figure 2:
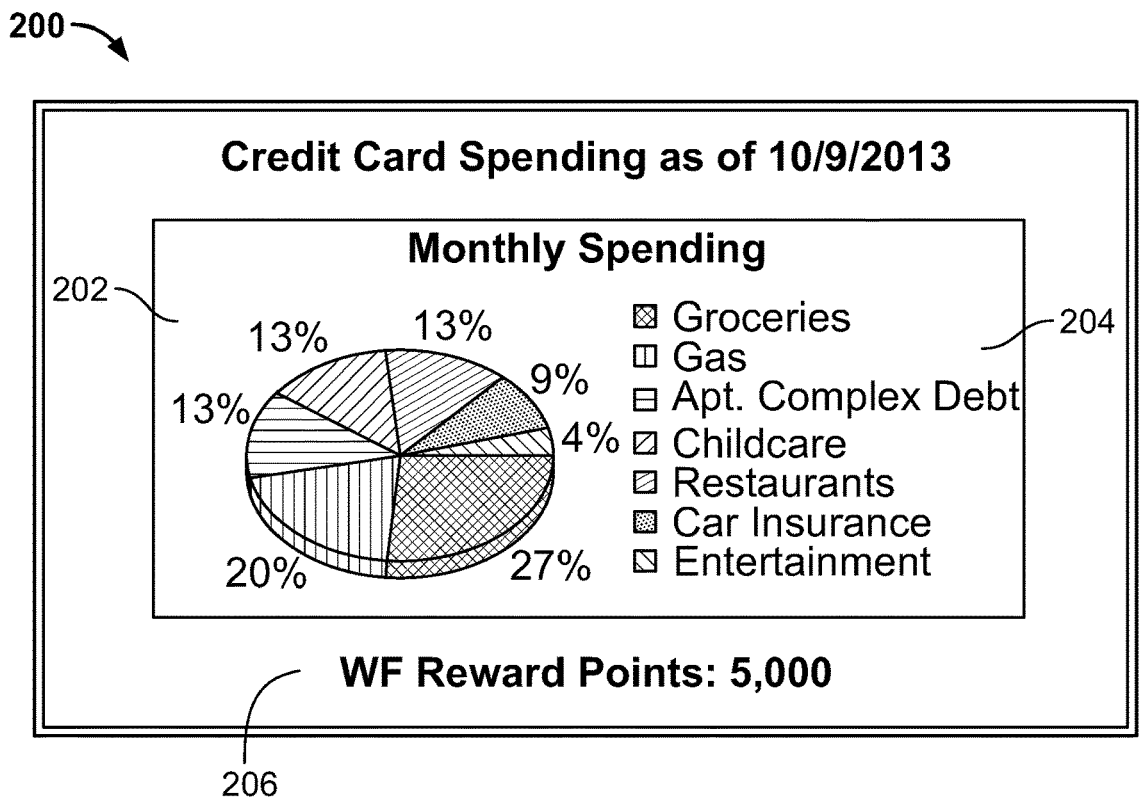
FIG. 2 shows an example payment card financial display that may appear on the headset display of FIG. 1.

FIG. 2 shows an example payment card financial display 200 that may appear on the headset display 110 when the user directs the headset camera 106 of the AR headset 104 to focus on the payment card 112. This can be accomplished, for example, by positioning the headset camera 106 so that the payment card 112 is visible, such as by having the user look at the payment card 112 while wearing the AR headset 104.

The example payment card financial display 200 shows example payment card spending for a month, in this example as of Oct. 19, 2013. A pie chart 202 is displayed showing a percentage of spending for various spending categories. Each category is typically shown in a unique color or shading. A legend 204 is provided showing the color or shading for each category. As shown, example spending categories include groceries, gas, apartment complex debt, childcare, restaurants, car insurance and entertainment. Other categories are possible. In addition, an example reward point total 206 is shown. The reward points are credits that may be used toward future purchases.

As stated earlier, the AR headset 104 may include a biometric capability that can be used to authenticate the user. Authentication is needed for security reasons to ensure that the wearer of the AR headset 104 is actually the same person as the owner of the payment card. In certain implementations, the wearer of the headset uses a digital dashboard to enter biometric authentication information to a server computer, for example server computer 102. The digital dashboard is typically a portal that can be accessed via an online or mobile banking application. The portal may be used to register the AR headset 104. Once registered, a connection may be made between the server computer 102 and the AR headset 104. After the connection is made, an AR application in the AR headset 104 may be used to scan the user's face, scan the user's retina, process the user's finger prints or process a voice print of the user. For example, when the user touches the headset display 110, the user's finger prints may be sent to the server computer 102. The user's face scan, retinal scan and voice print are also sent to the server computer 102. In certain implementations, only one or more of the face scan, retinal scan, voice print and finger prints are sent to the server computer 102.

When the user is actually wearing the AR headset 104 and looking at a payment card, the server computer determines an owner of the payment card based on the payment card identification number and CSC code. At the same time as the user is looking at the payment card via the AR headset 104, a software application in the headset electronics 108 performs one or more of a retinal scan, facial scan, voice scan or finger print scan of the user and sends the retinal scan, facial scan, voice scan or finger print scan to the server computer 102. The server computer 102 then compares the retinal scan, facial scan, voice scan or finger print scan previously registered for the user with the retinal scan, facial scan, voice scan or finger print scan received. When a successful comparison is made, the user is authenticated and the payment card financial data for the payment card may be displayed on the headset display 110. However, when the comparison is not successful, an alert may be displayed on the headset display 110, indicating an authentication failure. In the case of an authentication failure, the payment card financial data is not displayed on the headset display 110.

In some implementations, the AR headset 104 is configured such that whenever the user looks at both the front and back of the payment card, the payment card identification number and CSC code are automatically obtained by the AR headset 104 and transmitted to server computer and payment card financial information for the user is displayed on the AR headset 104. In other implementations, the user explicitly initiates a process by which the payment card financial information is displayed. One way in which the user may initiate the process is by a voice command. For example, the user may look at the payment card and then utter a command such as "display financial information." In some implementations, when the user initiates the process in this manner, a software application in the headset electronics 108, scans the front of the payment card and obtains the payment card identification number from the payment card. The software application is then configured to wait for the user until the user turns the payment card over and then scans the back of the payment card to obtain the CSC code. In some implementations, the headset electronics 108 uses optical character recognition to obtain the payment card identification number and CSC code from the scanned images. In other implementations, the AR headset electronics may send both scanned images to a server computer, for example server computer 102. In these implementations the server computer may use optical character recognition to obtain the payment card identification number and CSC code from the scanned images. In other implementations only the payment card identification number is used.

As stated earlier, another AR enhancement for payment cards is to indicate a preset payment card limit or budget limit for the user by displaying a color on the AR headset 104 or on the payment card itself that corresponds to the preset payment card limit or budget limit. For example, a color of green may indicate that the payment card is OK to use, a color of yellow may indicate that the user is getting close to the preset payment card limit or budget limit and a color of red may indicate that the preset payment card limit or budget limit has been exceeded. Other colors may be used.

In some implementations, when the user views the payment card using the AR headset 104, a color overlay may be displayed over the payment card. The color overlay corresponds to a current status of the payment card or budget limit. For example, when the payment card limit is exceeded, the payment card may appear red when viewed through the AR headset 104.

In some implementations, the user may initiate the above enhancement via a voice command. For example, the user may say "budget limit color" to initiate an operation in which a color corresponding to the preset budget limit for the user is displayed. As another example, the user may say "payment limit color" to initiate an operation is which a color corresponding to the preset payment limit for the user is displayed. Other or different voice commands may be used.

In some implementations, the AR headset 104 may be configured to display the color of the payment card on the headset display 110. In other implementations, the color is only displayed on the headset display 110 when the payment card lacks a color display capability. In still other implementations, the color is displayed on both the headset display 110 and the payment card.

After the voice command is issued, for example "budget limit color" or "payment limit color" the front and back of the payment card are scanned and the payment card identification number and CSC code are obtained and sent to a server computer before the color is displayed. In some implementations, only the front of the payment card is scanned and only the payment card identification number is sent to the server computer. For example, if an authentication method such as facial recognition, retinal scan or finger print scan is used to authenticate the user, the CSC code may not be necessary.

In another AR enhancement involving payment cards, a color corresponding to a preset payment card limit may be displayed on the headset display 110 or on the payment card when the payment card is scanned at a point of sale (POS) device. For example, when the user purchases an item at a store or online, and the user's payment card is scanned, an authorization for the purchase is processed at a server computer. When the user is wearing the AR headset 104 at the time of the purchase, the AR headset 104 may initiate a color change indication on the payment card that indicates a payment card status for the user after the purchase. For example, if the purchase puts the payment card near the payment card limit for the user, the payment card may display a yellow color. The use of the AR headset 104 for displaying a color indication for the payment card is explained in more detail later herein.

In still another AR enhancement involving payment cards, a payment card may flash or sound an audible alarm when the payment card has been designated as lost or stolen and an attempt is made to use the payment card when making a purchase at a POS device. For example, as described further below, the payment cards can incorporate smart technology like processors, communication devices (e.g., Bluetooth or Wi-Fi), and/or RFID tags. This technology can be used to change the state of the payment card for certain events. As described further, such events can be exceeding a certain budgetary threshold or the loss/theft of the card.

Figure 3:
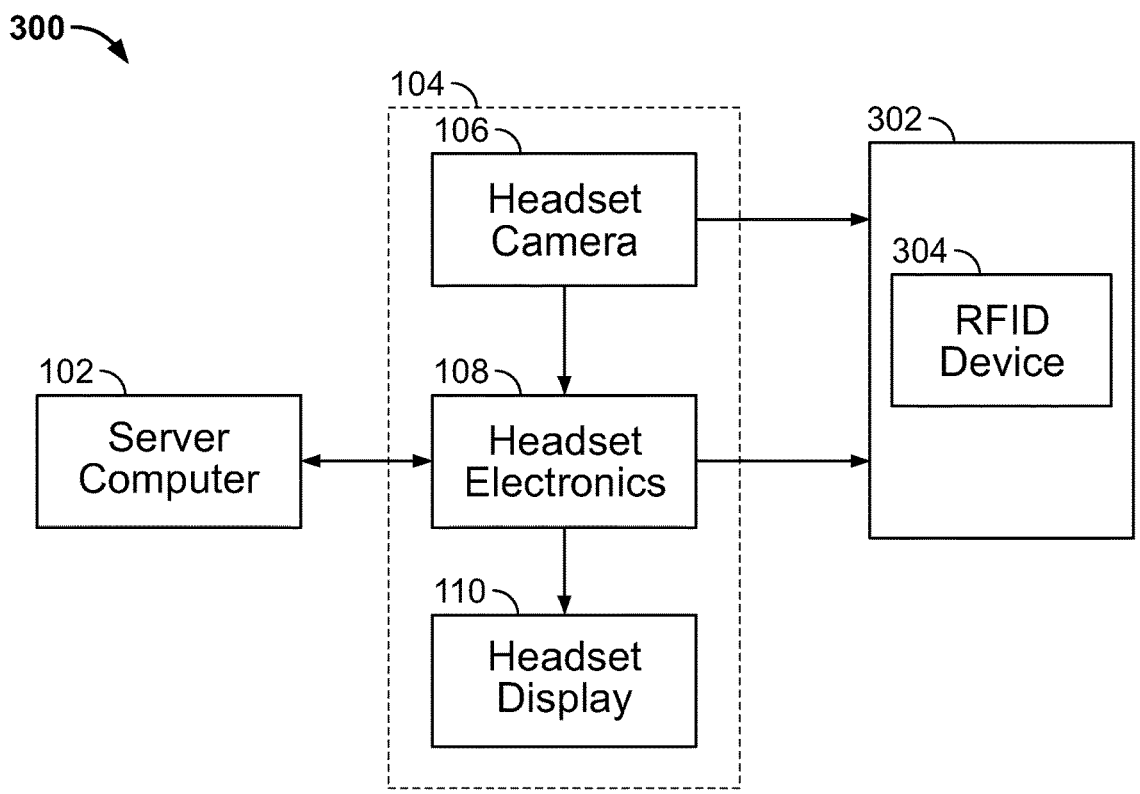
FIG. 3 shows an example system that supports a color display indication on a payment card or on the AR headset of FIG. 1.

FIG. 3 shows an example system 300 that supports a color display indication on a payment card or AR headset device. The example system 300 includes the server computer 102, the AR headset 104 and a payment card 302. The payment card 302 can be any type of card that can be used to make payments, such as a credit card, a debit card, or a prepaid card. The example payment card 302 includes an RFID device 304.

In an example implementation, the RFID device 304 is a passive RFID device with a color display capability. The RFID device derives power from the AR headset 104 when the AR headset is in close proximity to an RFID reader. In this implementation the AR headset 104 includes functionality for an RFID reader.

In the example implementation, the payment card 302 is scanned and payment card identification information is sent to server computer 102. When the headset electronics 108 receives payment card limit or budget limit information from the server computer 102, the headset electronics 108 sends a signal to the RFID device 304. Typically, a signal to a passive RFID device is used to read data from the RFID device. However, in this implementation the signal includes information regarding the payment card limit or budget limit. For example, the signal sent from the headset electronics 108 to the RFID device 304 may use a form of load modulation or inductive coupling. A power level or frequency within the signal may correspond to a particular color for the RFID device 304 to display.

The RFID device 304 may include a display, sticker or tag that displays a plurality of colors. A particular color that is displayed may correspond to a power level or frequency of the signal received at the RFID device 304. In this way, colors such as green, yellow or red may be displayed on the RFID device 304 to correspond to colors for an appropriate payment card limit or budget limit for the user. Other methods to activate a color indication at the RFID device 304 are possible. For example, the payment card can be equipped with active circuitry (such as an active RFID tag and/or processor) that is programmed to control a display or other device that can provide an indication of status. Such indicators can be LED displays and/or LED lights. In one example, one or more LEDs, such as a multi-color LED, are embedded into the payment card. The LED can be caused to light up and/or flash at a given color to provide indications to the user.

As stated earlier herein, other AR enhancements include depositing checks using an AR headset, paying a bill using an AR headset and reading and registering receipts using an AR headset.

Figure 4:
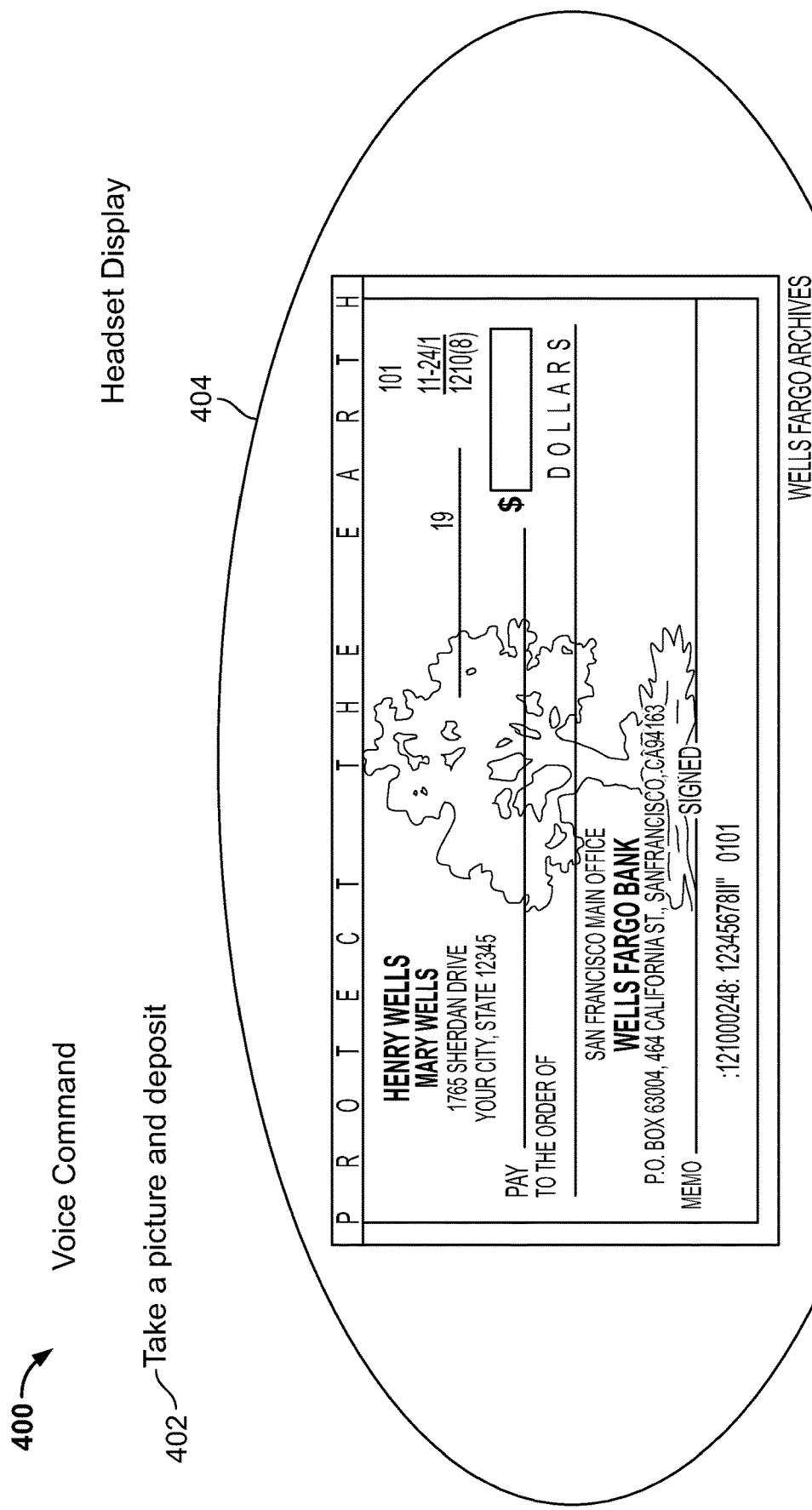
FIG. 4 shows an example illustration that depicts depositing checks using the AR headset of FIG. 1.

FIG. 4 shows an example illustration 400 that demonstrates depositing checks virtually using an AR headset. In the illustration 400, a user wearing an AR headset, for example AR headset 104, looks at an example check 404, which thereupon focuses the headset camera 106 on the check 404. The user then issues an example voice command 402 of "take a picture and deposit." A software application running on the AR headset 104 then causes headset camera 106 to take a picture of the check 404 and transmit the picture to headset electronics 108.

The software application also initiates a procedure to authenticate the user of the AR headset 104. As discussed, biometrics authentication is typically used, generally one or more of facial recognition, retinal scan, finger print scan or voice recognition. Biometric information obtained at the AR headset 104 is compared against a biometric profile of the user that is typically available on the AR headset 104.

When the user of the AR headset 104 is authenticated, in some implementations the headset electronics 108 sends a digitized picture of the check to server computer 102. In other implementations, optical recognition software in the AR headset 104 reads field data from the check and sends the field data to server computer 102. The field data may include the checking account number, check routing number, check amount, etc.

When server computer 102 receives the digitized picture of the check or the field data from the headset electronics 108, the server computer 102 determines whether the check has been previously deposited and if so, the date of the previous deposit. When a determination is made that the check has not been previously deposited, server computer 102 deposits the check.

After server computer 102 processes the check, server computer 102 sends check and account information to headset electronics 108 for display on headset display 110. When the check has been deposited, the check information includes a confirmation of the deposit, the date of the deposit and information as to whether the check has already cleared. When a determination is made that the check has already been deposited, the check information includes an indication that the check had already been deposited and that the current check deposit transaction has been terminated.

Figure 5:
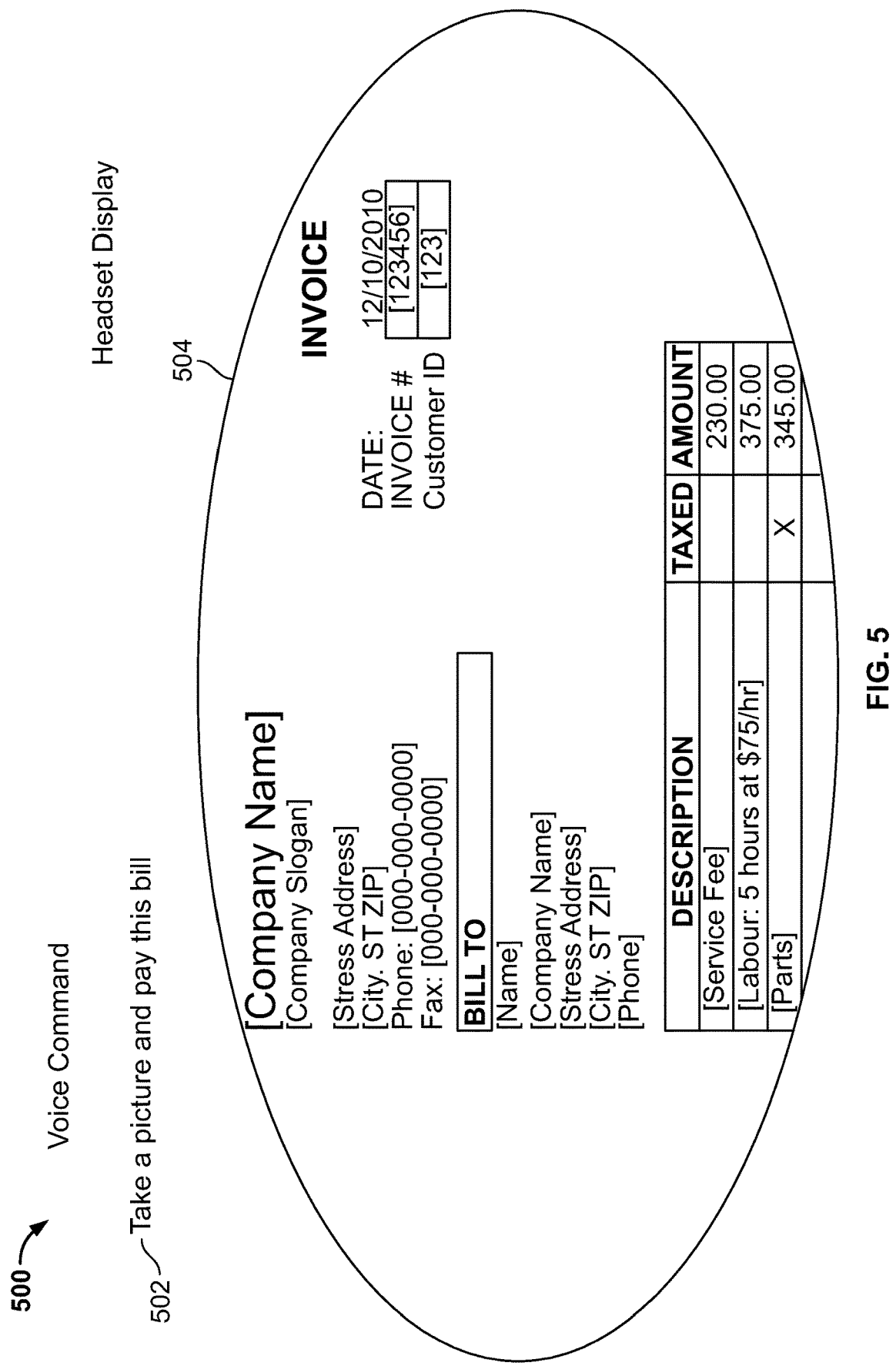
FIG. 5 shows an example illustration that depicts paying a bill using the AR headset of FIG. 1.

FIG. 5 shows an illustration 500 that demonstrates paying a bill using an AR headset. In the illustration 500, the user wearing AR headset 104 views an invoice for a bill 504. The user reviews the invoice and, if the information on the invoice is correct, the user may issue a voice command 502 to pay the bill 504. For example, the user may utter the command "take a picture and pay this bill." When the user utters this command, a bill pay software application on the AR headset 104 is initiated and the headset camera 106 takes a picture of the invoice.

The software application also initiates an authentication procedure for the wearer of the AR headset 104. As discussed, the authentication is typically performed by a biometric authentication method such as facial recognition, retinal scan, finger print scan and voice recognition. The authentication procedure verifies that the biometric information obtained matches a biometric profile of the owner of the AR headset 104.

After the wearer of the AR headset 104 is authenticated, in some implementations, optical recognition software in the headset electronics 108 reads fields within the invoice. Data within the fields is then formatted and sent to server computer 102. The server computer 102 then debits an account for the user in the amount of the invoice and initiates a bill payment process. In other implementations, the headset electronics 108 may send a digitized representation of the picture of the invoice directly to the server computer 102. In these implementations, optical recognition software in server computer 102 may read the fields within the invoice.

The systems and methods of this disclosure also permit reading and registering a receipt using an AR headset. The receipt is typically a receipt for a business expense. The user wearing AR headset 104 views an expense receipt. The user reviews the receipts and then utters a voice command such as "read the receipt." When the user utters this command, a receipt read software application on the AR headset 104 is initiated and the headset camera 106 takes a picture of the receipt. The software application also initiates a procedure to authenticate the user via biometric means, as discussed earlier herein.

Upon reviewing the receipt, the user may determine that there are one or more items on the receipt that cannot be included on an expense report. For example, the user may have bought a candy bar at one point during a business trip and according to company policies the candy bar may not be expensed. The user may then utter a command such as "edit receipt." The user may then deselect items on the receipt. In some implementations, the de-selection may be done via a voice command, for example "deselect candy bar." In other implementations, the de-selection may be done by tapping an item to be deselected on the headset display 110. The AR headset 104 may also be configured such that tapping an item on the headset display 110 results in a selection of an item rather than a de-selection of an item. After items have been selected/deselected, the user may issue a command such as "register receipt" to send receipt information to the server computer 102.

Server computer 102 registers the receipt to an expense account for the user. If the server computer 102 determines that there is no expense account consistent with the receipt, server computer 102 creates a new expense account. In addition, if the user has a profile that indicates that the user is a free-lance employee who may work for multiple companies, server computer 102 organizes received receipts to a specific company for the user.

The user at AR headset 104 may utter a voice command to display the expense report on the headset display 110. The user at AR headset 104 may also utter a voice command to initiate an automatic generation of expense reports for the user. For example the user may utter a command such as "auto-generate expense reports for the current time period" or "auto-generate expense reports weekly."

If the user is authorized, the user may also opt-in to receive alerts when authorized users scan receipts. The opt-in may be part of a profile for the user and may be initiated via a digital dashboard for the user. The digital dashboard is typically accessed by a mobile device such as a smart telephone. The alerts may be displayed on the headset display 110.

Figure 6:
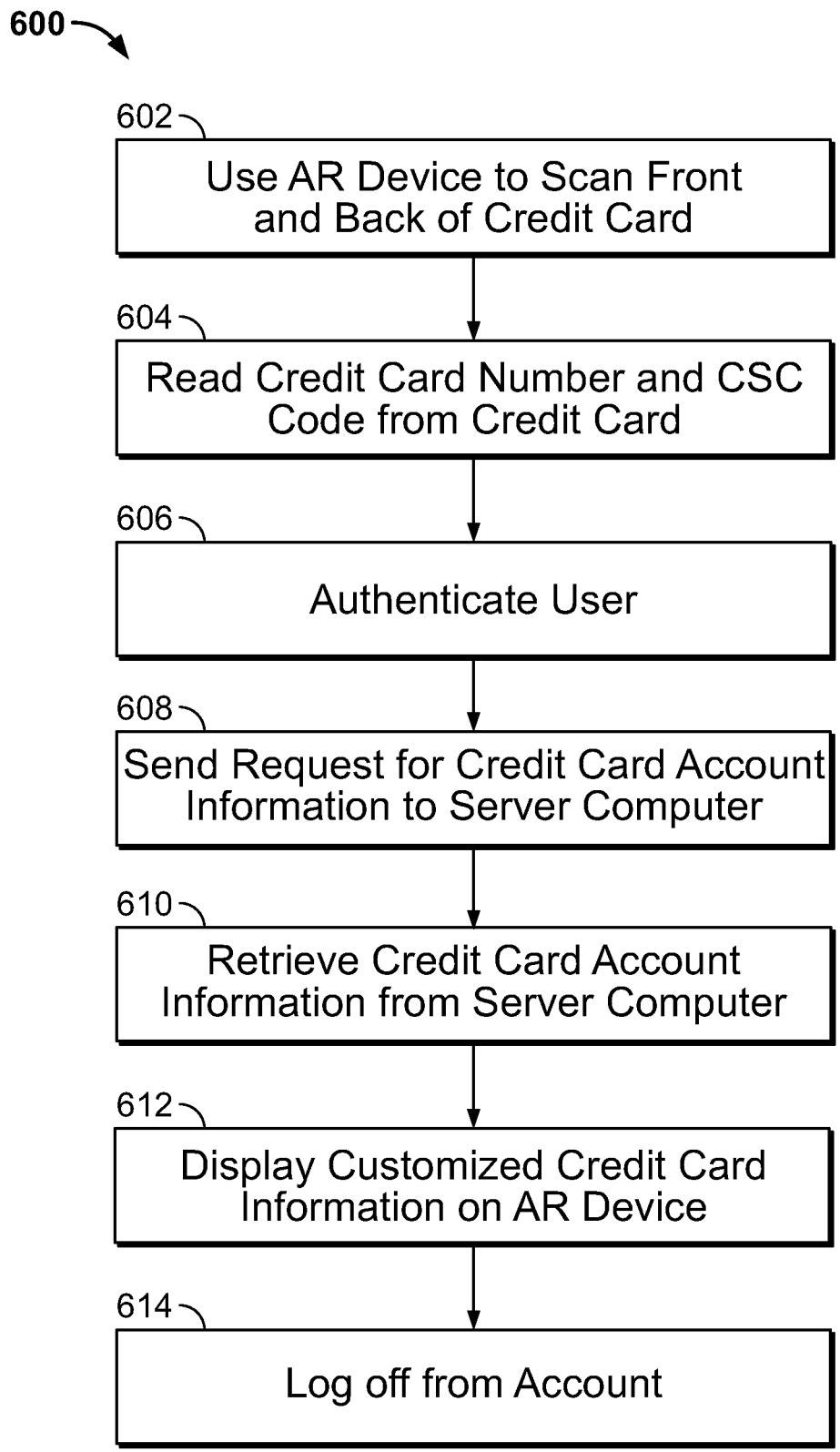
FIG. 6 shows a flowchart for an example method for displaying payment card information for a user on the AR headset of FIG. 1.

FIG. 6 shows a flowchart for an example method 700 for displaying payment card information for a customer on an AR device. For the example method 700, the AR device is a smart glass device, such as Google Glass, that the customer wears. In this discussion, the AR device may be referred to as AR headset 104. Also, in this discussion, the terms customer and user may be used interchangeably.

At operation 602, the AR device is used to scan the front and back of the customer's payment card. In some implementations, when the customer looks at the payment card with the AR device, the payment card may be scanned automatically. In other implementations, the customer may utter one or more commands, such as "scan front of payment card" and "scan back of payment card." In some implementations, scanning the payment card comprises taking a picture of the front and back of the payment card. In other implementations, scanning the payment card comprises sending a video image of the payment card to the AR headset 104. For example, when the user looks at the front or back of the payment card for longer that a predetermined amount of time, for example 5 seconds, an image of the front or back of the payment card, respectively, may be transmitted to the AR headset 104.

At operation 604, the AR device reads the payment card number and CSC code from the payment card. In the method 600, the headset electronics 108 of the AR device includes optical recognition software. The optical recognition software reads the credit card number and CSC code from the payment card. In other implementations, the pictures of the front and back of the payment card or the video image may be sent to a server computer, for example server computer 102 for reading the payment card number and CSC code.

At operation 606, the user is authenticated. The authentication verifies that the user (i.e. the person who is currently wearing the AR device) is also the owner of the AR device or a person who is authorized to use the AR device. The authentication uses a biometric method such as facial recognition, retinal scan, voice print and finger print scan. The user is authenticated when biometric information obtained via the biometric method matches a biometric profile for the owner or authorized user of the AR device.

At operation 608, after the user is authenticated, a request for payment card account information for the user is sent to server computer 102. The request typically includes the payment card number, the CSC code and an indication that the user has been authenticated. For security purposes, the indication that the user has been authenticated may include a security code, known to both the AR device and the server computer 102.

At operation 610, payment card account information for the user is retrieved from server computer 102. The payment card account information may include such items as a current balance, a credit limit, a breakdown of user spending year-to-date by category and a breakdown of user spending month-to-date by category. Other types of payment card account information may be retrieved from server computer 102.

At operation 612, customized payment card information for the user is displayed on headset display 110 of the AR device. The customized payment information may include account balances, payment limits and spending breakdowns on a monthly or yearly basis. One example of a payment limit is a credit card limit. As discussed, FIG. 2 shows an example display of customized payment card information.

At operation 614, the user logs off from the server computer 102. In some implementations the user may utter a phrase such as "log off" or "clear display." In other implementations, the user may simply look away from the payment card for a predetermined amount of time, for example 30 seconds. When the user logs off, the display of payment card account information is cleared on the headset display 110.

Figure 7:
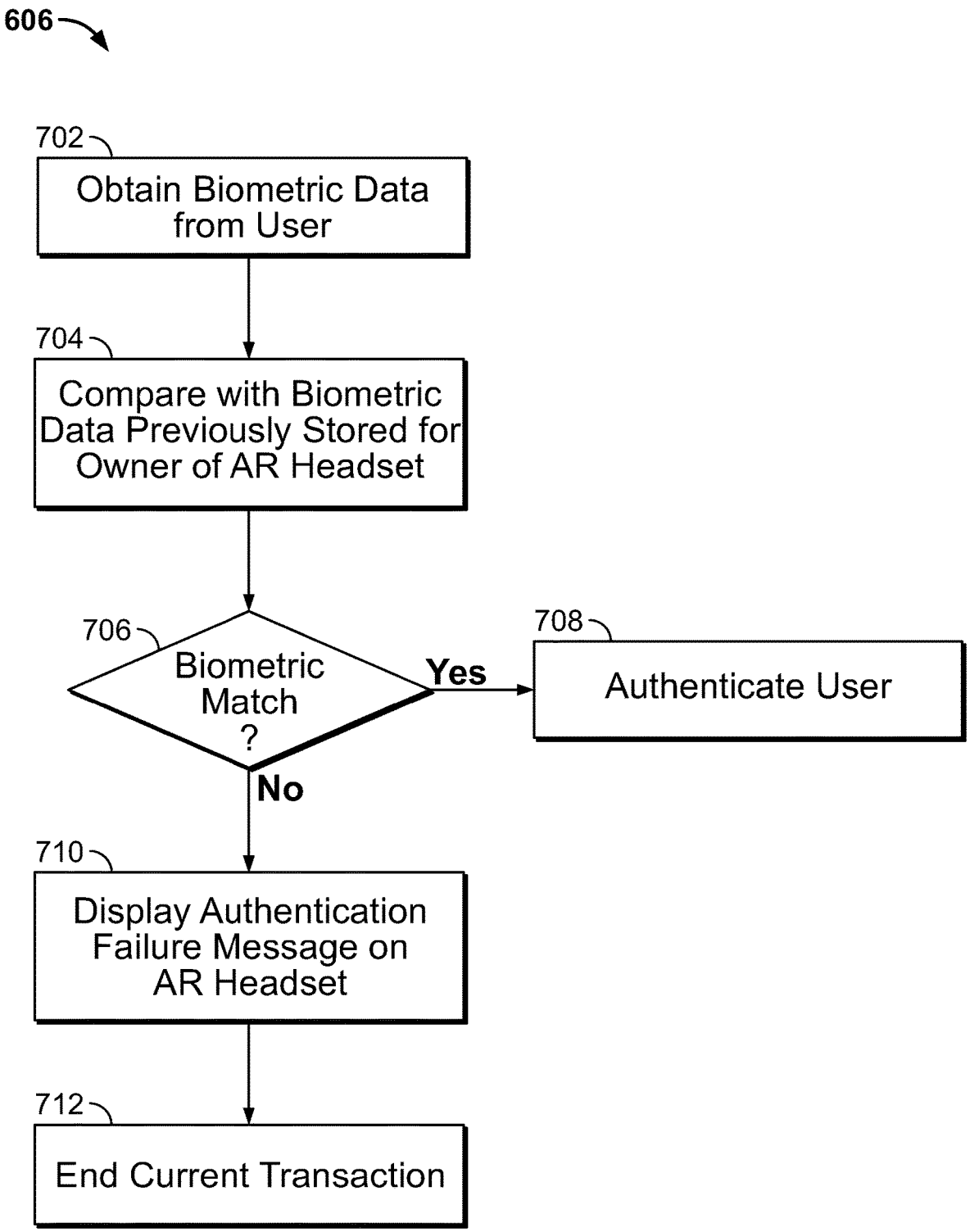
FIG. 7 shows a flowchart for an example method for authenticating a user.

FIG. 7 shows a flowchart of a method for the operation 606 for authenticating the user. At operation 702, biometric information is obtained from the user. Typically, the biometric information is obtained from one of facial recognition, retinal scan, voice print or finger print scan. Facial recognition comprises scanning the user's face with the headset camera 106 and extracting specific facial features from the scanned image of the user's face. Retinal scan uses unique patterns on the user's iris in order to identify the user. Voice print obtains a spectrogram of the user's voice, for example when the user utters a command. Finger print scan uses finger print recognition to identify the user. In some implementations, finger print recognition hardware and software is built into the AR device. For example, when the user touches the headset display 110, the user's finger print may be scanned.

At operation 704, the biometric information for the user obtained at operation 702 is compared with previously obtained biometric information for the user. Typically, when the user is assigned an AR device, a biometric profile is compiled for the user and stored on the AR device. The profile may include one or more of a facial profile, a retinal profile, a voice print and a finger print.

At operation 706, a determination is made as to whether the biometric information obtained at operation 702 matches the previously obtained biometric information for the user. When a determination is made that there is a match, at operation 708, the user is designated as being authenticated.

When a determination is made that there is not a match, at operation 710, a message is displayed on the headset display 110 indicating that there is an authentication failure and that the current transaction (for example displaying payment card financial information on the AR device) has been ended.

At operation 712, the current transaction is ended.

Figure 8:
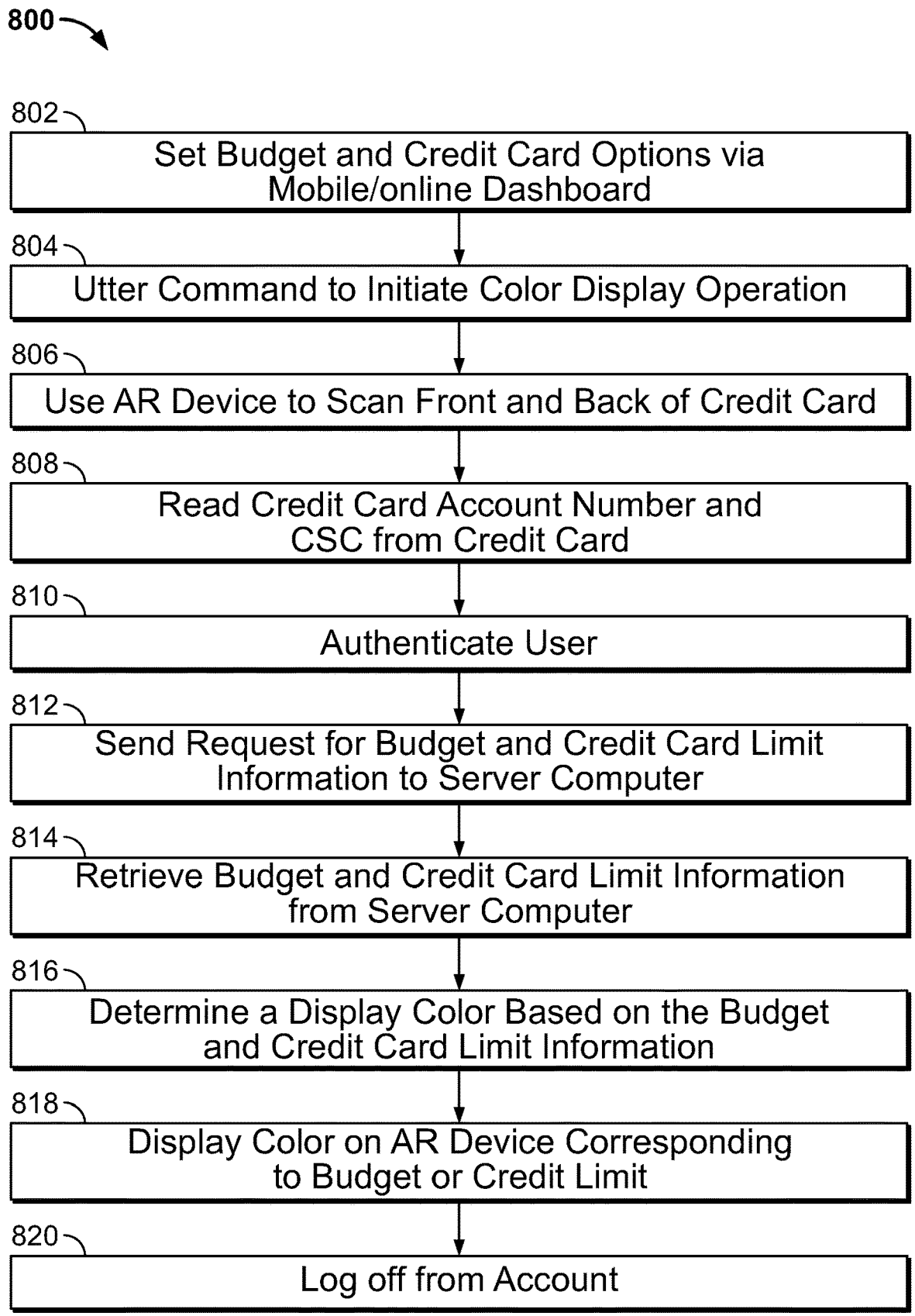
FIG. 8 shows a flowchart for an example method for displaying a color that represents a budget or payment card limit on the AR headset of FIG. 1.

FIG. 8 shows a flowchart for a method 800 for displaying a color on the AR device indicating a budget or payment card limit for the user. For the example method 800, the AR device is AR headset 104.

At operation 802, budget and payment card options are set for the user via a mobile or online dashboard. The budget options comprise setting a budget for the user. The budget options include setting a spending limit for a specific time period. The time period may be a week, a month, a year or other time periods. The user may also set spending limits for various spending categories, such as entertainment and clothing purchases. The payment card options may include setting spending limits for the payment card for various spending categories. The dashboard on which the budget and payment options are set is a user interface of a personalized web page for the user, for example a personalized bank web page. The web page may be available online or from a mobile device, such as a smart telephone or laptop computer.

At operation 804, the user utters a command to initiate the color display operation. For example, the user may utter "display budget color" to display a color corresponding to a budget limit for the user. The user may utter "display payment card color" to display a color corresponding to a payment card limit. Variations of these commands or different commands may be used. When one of the commands is uttered, the AR device activates a software application for operations of method 800.

At operation 806, the AR device is used to scan the front and back of a payment card. In some implementations, a message is displayed on the headset display 110 prompting the user to first scan the front of the payment card and then scan the back of the payment card. In some implementations, the AR device may issue an audible command. In other implementations, the user may simply look at the front or back of the payment card without any prompts from the AR device.

At operation 808, an optical character recognition program in the software application reads the payment card account number and the CSC code from the scanned payment card images. In other implementations, the scanned images may be sent to a server computer to read the payment card account number and the CSC code.

At operation 810, the user is authenticated using a biometric method discussed earlier herein. The authentication determines whether the user matches the owner of the AR device or is authorized to use the AR device.

At operation 812, a request for budget or payment card limit information is sent to server computer 102. The request typically includes the account number and CSC code for the payment card. The request also includes an indication that the user has been authenticated and is authorized to obtain this information.

At operation 814, budget or payment card limit information is retrieved from server computer 102. At operation 816, a color is designated from the budget or payment card information. The color represents a degree to which the user is close or over the budget or payment card limit. For example, green may be designated when the user is comfortably within the budget or payment card limit, yellow may be designated when the user is near the budget or payment card limit and red may be designated when the user is over the budget or payment card limit.

At operation 818, the designated color is displayed on the headset display 110. Other information, for example the budget or payment card limit and the current spending for the user may also be displayed.

At operation 820, the user logs off from the user's account on the server computer 102. The user may log out by uttering a command to log off or by simply looking away from the payment card for a predetermined period of time. When the user logs off, the displayed color is cleared on the headset display 110 and the budget or payment card limit information is also cleared on the headset display 110.

Figure 9:
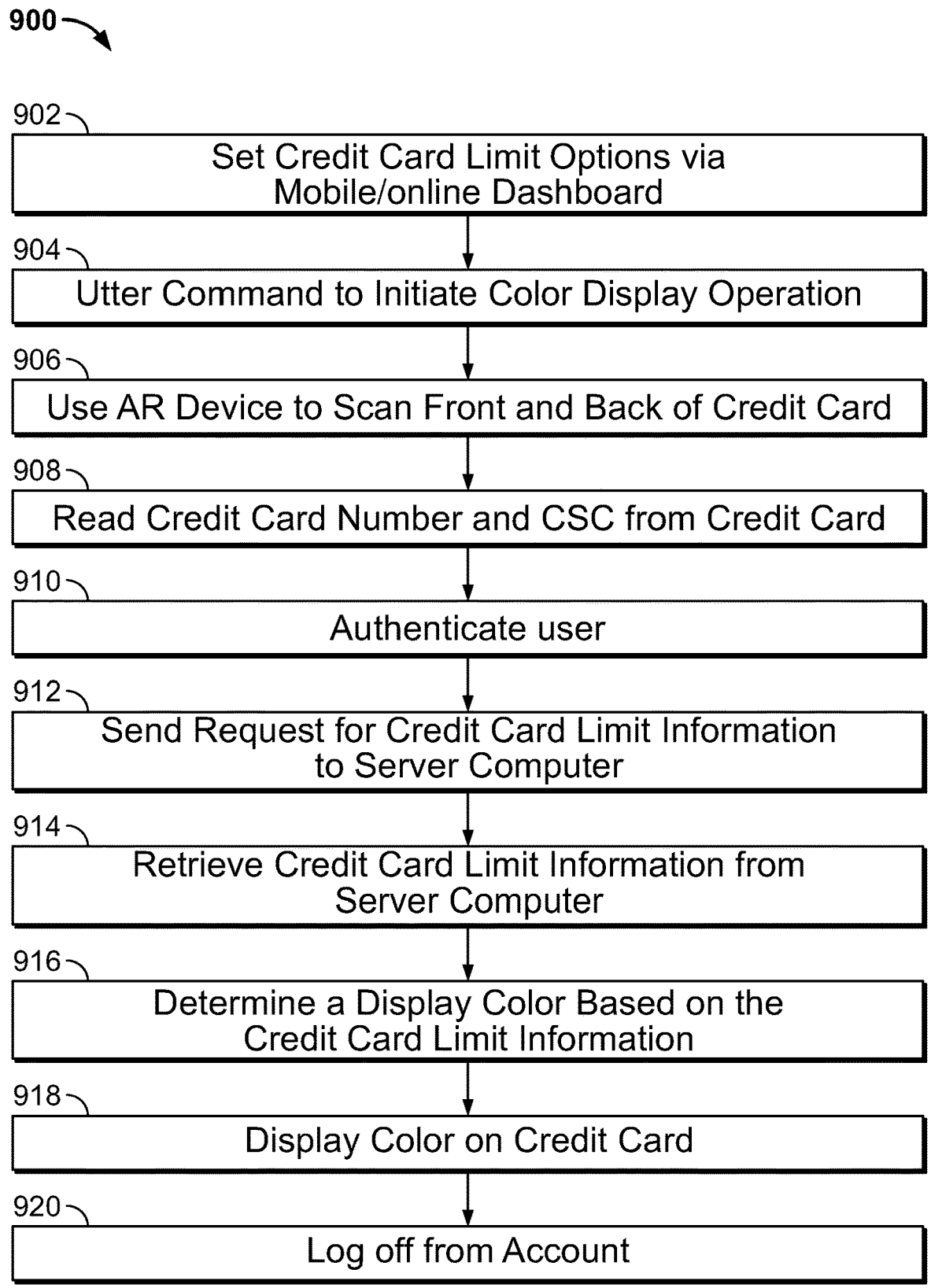
FIG. 9 shows a flowchart for an example method for displaying a color on a payment card that indicates a payment card limit for a user.

FIG. 9 shows a flowchart for a method 900 for displaying a color on a payment card indicating a payment card limit for the user. The color is displayed via a command from an AR device. For the example method 900, the AR device is AR headset 104.

At operation 902, payment card options are set for the user via a mobile or online dashboard, in a same manner as for operation 802.

At operation 904, the user utters a command to initiate the color display operation on the payment card. For example, the user may utter "display color on payment card for payment card limit" to display a color on the payment card corresponding to a payment card limit for the user. When the command is uttered, the AR device activates a software application for operations of method 900.

At operation 906, the AR device is used to scan the front and back of the payment card. At operation 908, the payment card account number and CSC are read from the payment card, in a same manner as for operation 808. At operation 910, the user is authenticated in a same manner as for operation 810.

At operation 912, the AR device sends a request for payment card limit information to server computer 102. At operation 914, payment card limit information is retrieved from server computer 102. At operation 916, a display color is determined based on the payment card limit information retrieved.

At operation 918, the determined color is displayed on the payment card. Typically, the color is displayed on an RFID tag or sticker on the payment card. As discussed earlier herein, a passive RFID tag is typically used on the payment card. Signal information from the AR device transmits power to the RFID tag and also triggers a display of the determined color on the RFID tag. In some implementations, as discussed, the display color may be determined by a power level of the signal transmitted from the AR device.

At operation 920, the user logs off from the user's account on the server computer 102. The user may log out by uttering a command to log off or by simply looking away from the payment card for a predetermined period of time. When the user logs off, the color display on the payment card is cleared.

Figure 10:
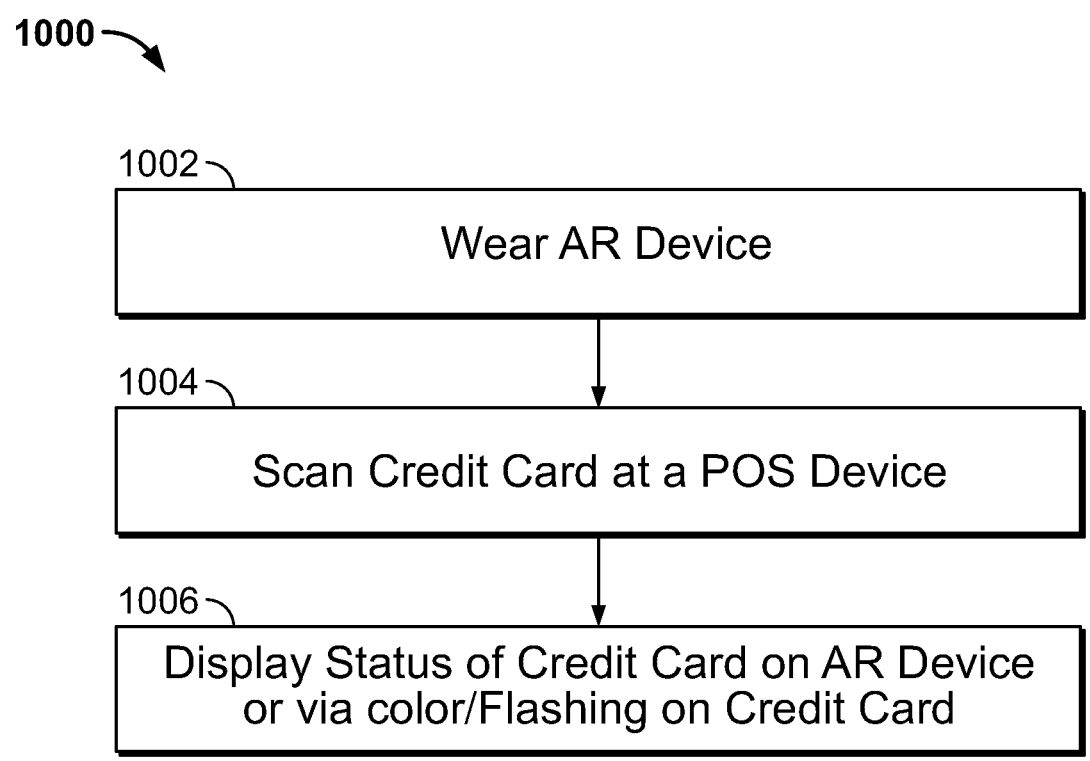
FIG. 10 shows a flowchart for an example method for displaying payment card status on the AR headset of FIG. 1 when the payment card is scanned at a point of sale device.

FIG. 10 shows a flowchart for a method 1000 for displaying payment card status when a payment card is scanned at a POS device and when the payment card is in close proximity to a user wearing an AR device.

At operation 1002, the user puts on an AR device, typically a headset such as the AR headset 104. At operation 1004, the user wearing the AR device makes a purchase and scans a payment card at a POS device to pay for the purchase.

At operation 1006, a status of the payment card is displayed at the AR device. The status takes into account an amount of the purchase. If the amount of the purchase causes the payment card limit of the user to be exceeded, a message to that effect is displayed on the AR device, for example on headset display 110. In some implementations, if the amount of the purchase causes the payment card limit of the user to be exceeded, the payment card provides an indication thereon, such as by flashing.

Figure 11:
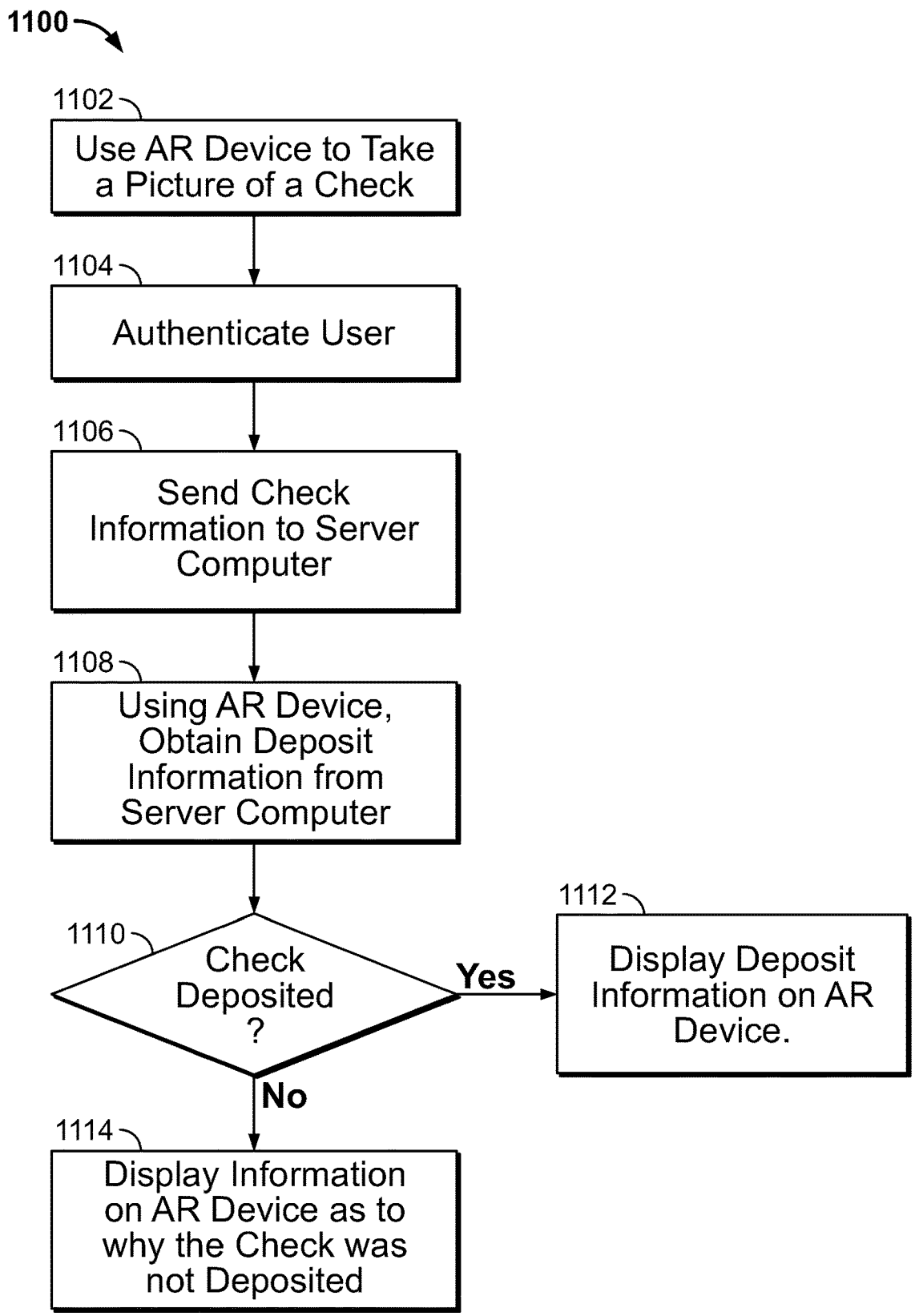
FIG. 11 shows a flowchart for an example method for electronically depositing a check using the AR headset of FIG. 1.

FIG. 11 shows a flowchart for a method 1100 for electronically depositing a check using an AR device. For the example method 1100, the AR device is AR headset 104.

At operation 1102, a user wearing AR headset 104 takes a picture of a check to be deposited using headset camera 106.

At operation 1104, the user is authenticated using one of the biometric authentication methods discussed earlier herein.

At operation 1106, check information and authentication information is sent to server computer 102. The authentication information provides a confirmation that the user is either an owner of the AR headset 104 or authorized to use the AR headset 104. The confirmation may be a security code generated by headset electronics 108, an authentication flag in a message to server computer 102 or another means of confirming an authenticity of the user.

In some implementations the check information may include specific fields within the check, such as a bank name, routing code, account number, name and address on the check, payee, date and amount of the check. In these implementations, the check information is obtained via an optical character software recognition program in the headset electronics 108. In other implementations, the picture of the check is sent to the server computer 102 and an optical character software recognition program on server computer 102 extracts check information from the picture of the check. The picture of the check sent to server computer 102 is a digitized picture of the check.

At operation 1108, deposit information for the check from the server computer 102 is received by AR headset 104. If the check was deposited, the deposit information includes a confirmation number for the deposit and the deposit date. If the check was not deposited, the deposit information includes a reason why the check was not deposited. One common reason why the check may not have been deposited is that the check may have been previously deposited.

At operation 1110, a determination is made as to whether the check was deposited. When a determination is made that the check was deposited, at operation 1112, deposition information is displayed on headset display 110 of the AR device. The deposit information typically includes the confirmation number and the deposit date. When a determination is made that the check was not deposited, at operation 1114, a reason why the check was not deposited is displayed on the headset display 110 of the AR device.

Figure 12:
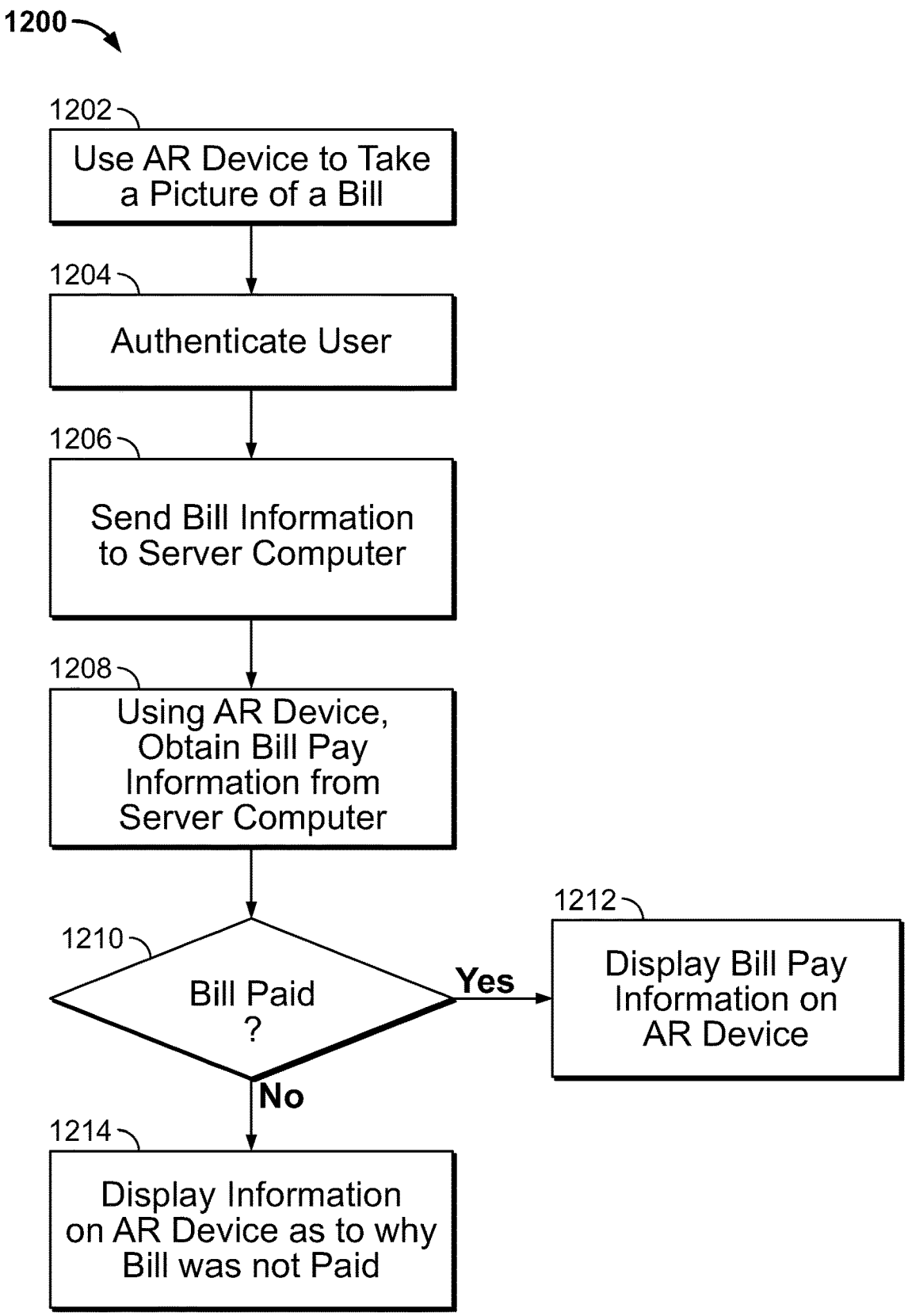
FIG. 12 shows a flowchart for an example method for paying a bill using the AR headset of FIG. 1.

FIG. 12 shows a flowchart for a method 1200 for paying a bill using an AR device. For the example method 1200, the AR device is AR headset 104.

At operation 1202, a user wearing AR headset 104 takes a picture of a bill to be paid using headset camera 106.

At operation 1204, the user is authenticated using one of the biometric authentication methods discussed earlier herein.

At operation 1206, bill pay and authentication information is sent to server computer 102. The authentication information provides a confirmation that the user is either an owner of the AR headset 104 or authorized to use the AR headset 104. The confirmation may be a security code generated by headset electronics 108, an authentication flag in a message to server computer 102 or another means of confirming an authenticity of the user.

In some implementations, the bill pay information may include specific fields within the bill, such as the name of the party to be paid, the amount of the bill, the date of bill, etc. In other implementations, the picture of the bill is sent to the server computer 102 and an optical character software recognition program on server computer 102 extracts bill pay information from the picture of the bill. The picture of the bill sent to server computer 102 is a digitized picture of the bill.

At operation 1208, payment information for the bill from the server computer 102 is received by AR headset 104. If the bill was paid, the payment information includes a confirmation number for the payment and a payment date. For example, the confirmation number may comprise an identification number for a check used to pay the bill. If the bill was not paid, the payment information includes a reason why the bill was not paid. One reason why the bill may not have been paid is that the bill may have been previously paid. Another reason may be that an expense associated with the bill may not have been authorized.

At operation 1210, a determination is made as to whether the bill was paid. When a determination is made that the bill was paid, at operation 1212, payment information is displayed on headset display 110 of the AR device. The payment information may include a confirmation statement, a check number for a check used to pay the bill and a payment date. When a determination is made that the bill was not paid, at operation 1214, a reason why the bill was not paid is displayed on the headset display 110 of the AR device.

Figure 13:
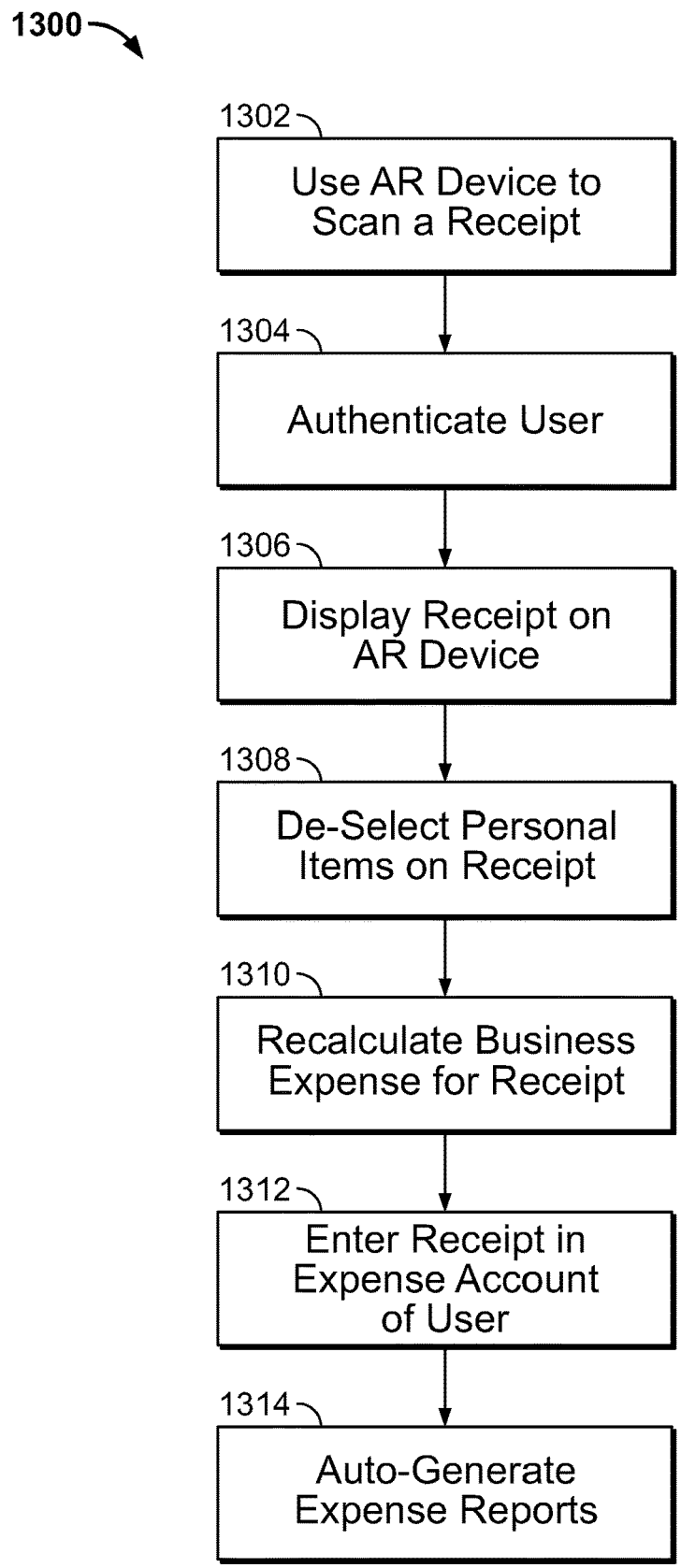
FIG. 13 shows a flowchart for an example method for reading and registering a receipt using the AR headset of FIG. 1.

FIG. 13 shows a flowchart for a method 1300 for reading and registering a receipt using an AR device. For the example method 1300, the AR device is AR headset 104.

At operation 1302, a user wearing AR headset 104 uses headset camera 106 to scan a receipt into headset electronics 108. In some implementations, the receipt is automatically scanned when the user looks at the receipt. In other implementations, the user may utter an audible command, such as "scan receipt." When the headset electronics 108 makes a determination that the receipt is to be scanned, a software application for reading and registering receipts is initiated at the AR headset 104.

At operation 1304, the user is authenticated using one of the biometric authentication methods discussed earlier herein.

At operation 1306, the scanned receipt is displayed on the headset display 110 of the AR headset 104.

At operation 1308, the user may de-select one or more items in the receipt. For example if there are any items on the receipt, for an example a candy bar, that may not be expensed, those items can be de-selected before submission of the receipt. In some implementations, the user may de-select an item by tapping on the displayed item on the headset display 110. In other implementations, the user may utter a voice command to de-select the item.

At operation 1310, the headset electronics 108 recalculates expenses on the receipt based on items that have been de-selected.

At operation 1312, the headset electronics 108 enters the amount of the receipt and details for the receipt on the AR headset 104. The headset electronics 108 also sends details of the receipt to server computer 102 for storage at a data store. The data store may be on server computer 102 or external to server computer 102.

At operation 1314, the headset electronics 108 may initiate an auto-generation of an expense report for the user. In some implementations, the headset electronics compiles the expense report based on receipt information for the user stored on the headset electronics 108. In other implementations, the headset electronics may send a message to server computer 102 to generate the expense report for the user. The headset electronics 108 may be configured to generate expense reports on a periodic basis, for example weekly or the headset electronics may be configured to generate expense reports for a specific time period.

Figure 14:
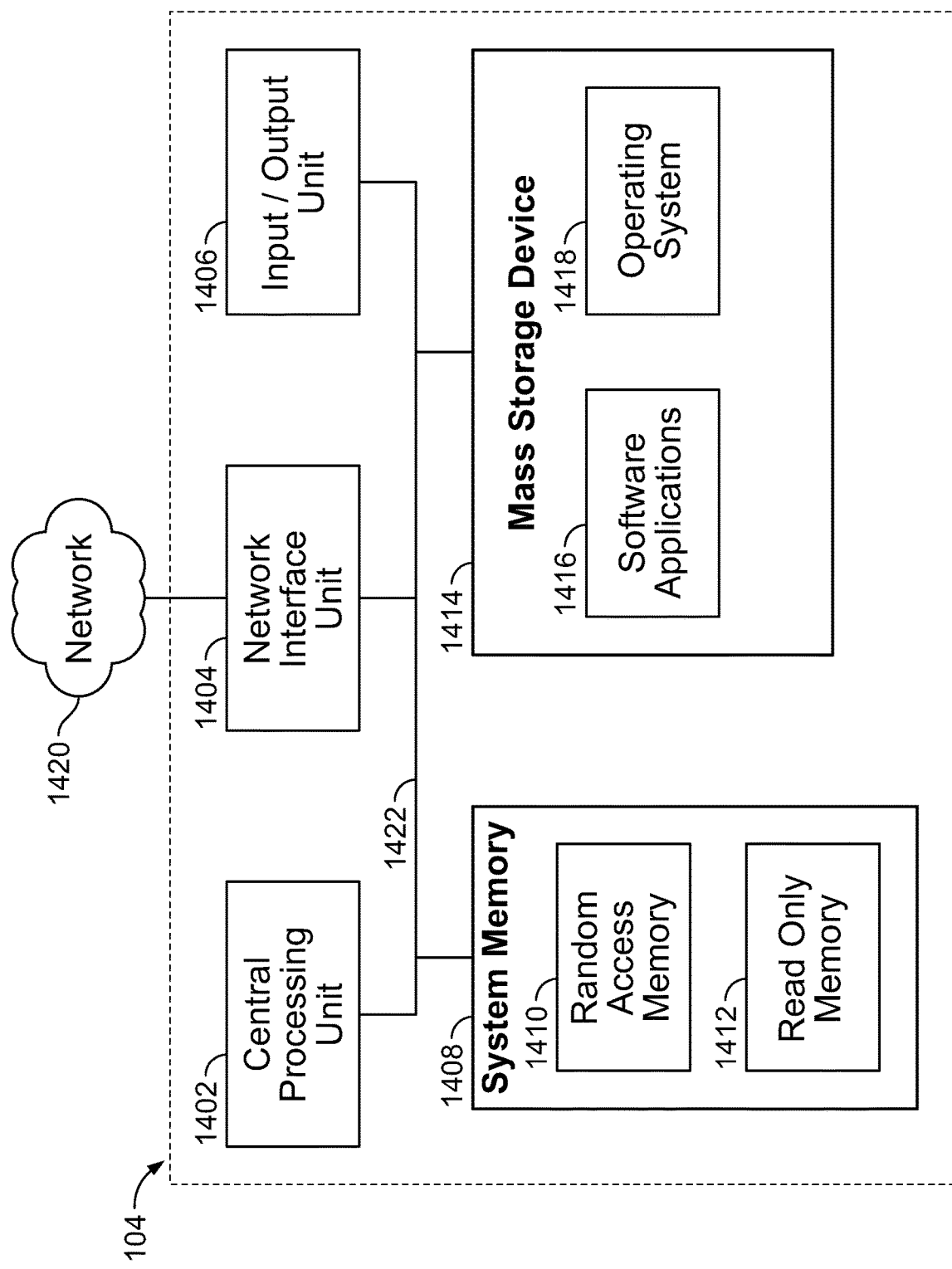
FIG. 14 shows example physical components of the AR headset of FIG. 1.

As illustrated in the example of FIG. 14, the AR headset 104 includes at least one central processing unit ("CPU") 1402, a system memory 1408, and a system bus 1422 that couples the system memory 1408 to the CPU 1402. The system memory 1408 includes a random access memory ("RAM") 1410 and a read-only memory ("ROM") 1412. A basic input/output system contains the basic routines that help to transfer information between elements within the AR headset 104, such as during startup, is stored in the ROM 1412. The AR headset 104 further includes a mass storage device 1414. The mass storage device 1414 is able to store software instructions and data. A central processing unit, system memory and mass storage device similar to that in FIG. 14 are also included in server computer 102.

The mass storage device 1414 is connected to the CPU 1402 through a mass storage controller (not shown) connected to the system bus 1422. The mass storage device 1414 and its associated computer-readable data storage media provide non-volatile, non-transitory storage for the AR headset 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 102.

According to various embodiments of the invention, the AR headset 104 may operate in a networked environment using logical connections to remote network devices through the network 1420, such as a wireless network, the Internet, or another type of network. The AR headset 104 may connect to the network 1420 through a network interface unit 1404 connected to the system bus 1422. It should be appreciated that the network interface unit 1404 may also be utilized to connect to other types of networks and remote computing systems. The AR headset 104 also includes an input/output controller 1406 for receiving and processing input from a number of other devices, including a touch user interface display screen, or another type of input device. Similarly, the input/output controller 1406 may provide output to a touch user interface display screen or other type of output device.

As mentioned briefly above, the mass storage device 1414 and the RAM 1410 of the AR headset 104 can store software instructions and data. The software instructions include an operating system 1418 suitable for controlling the operation of the AR headset 104. The mass storage device 1414 and/or the RAM 1410 also store software instructions, that when executed by the CPU 1402, cause the AR headset 104 to provide the functionality of the AR headset 104 discussed in this document. For example, the mass storage device 1414 and/or the RAM 1410 can store software instructions that, when executed by the CPU 1402, cause the AR headset 104 to display received financial data on the display screen of the AR headset 104.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A non-transitory computer readable storage medium of an augmented reality electronic computing device including instructions embedded thereon which, when executed by the augmented reality electronic computing device, cause the augmented reality electronic computing device to:
   authenticate a user using biometric information, including one or more of facial recognition, retinal scan, voice print and fingerprint scan;
   scan a receipt;
   receive a voice command specifying deselection of one or more items on the receipt, the voice command causing the augmented reality electronic computing device to deselect the one or more items creating a modified receipt;
   obtain financial information from the modified receipt to be included in an expense report, the financial information to be included in the expense report excluding the one or more items that were deselected on the receipt;
   register the modified receipt excluding the one or more items that were deselected on the receipt;
   send the financial information from the modified receipt to a server computer;
   receive from the server computer a confirmation that the financial information from the modified receipt has been included in the expense report; and
   display the confirmation on the augmented reality electronic computing device.

2. The non-transitory computer readable storage medium of claim 1, further comprising instructions which, when executed by the augmented reality electronic computing device, cause the augmented reality electronic computing device to:
   receive the expense report from the server computer; and
   display the expense report on the augmented reality electronic computing device.

3. The non-transitory computer readable storage medium of claim 1, wherein the augmented reality electronic computing device is a headset comprising a wearable computer with an optical head-mounted display.

4. An augmented reality electronic computing device, comprising:
   a wearable headset having a camera;
   an optical display mounted to the wearable headset and having a glass portion;
   an input controller configured to receive voice input from a user;
   one or more processors; and
   a non-transitory computer readable storage medium including instructions embedded thereon which, when executed by the one or more processors, cause the one or more processors to:
     authenticate a user using biometric information, including one or more facial recognition, retinal scan, voice print and fingerprint scan;
     scan a receipt using the camera;
     receive a voice command from a wearer of the wearable headset using the input controller, the voice command specifying deselection of one or more items on the receipt, the voice command causing the augmented reality electronic computing device to deselect the one or more items creating a modified receipt;
     obtain financial information from the modified receipt to be included in an expense report, the financial information to be included in the expense report excluding the one or more items that were deselected on the receipt;
     send the financial information from the modified receipt to a server computer;
     receive, from the server computer, a confirmation that the financial information from the modified receipt has been included in the expense report; and
     display the confirmation in the glass portion of the optical display.

\* \* \* \* \*